United States Patent

[11] 3,584,884

| [72] | Inventor | Francis Joseph Fuchs, Jr.<br>Princeton Junction, N.J. |
|---|---|---|
| [21] | Appl. No. | 758,877 |
| [22] | Filed | Sept. 10, 1968 |
| [45] | Patented | June 15, 1971 |
| [73] | Assignee | Western Electric Company, Incorporated<br>New York, N.Y. |

[54] PRESSURE ELONGATABLE SUPPORT APPARATUS
13 Claims, 3 Drawing Figs.

[52] U.S. Cl. .................................................... 277/59,
   92/52, 277/187
[51] Int. Cl. .................................................... B65d 53/00,
   F16j 15/48
[50] Field of Search .......................................... 277/59, 60,
   73, 103, 165, 187, 188; 60/54.5; 91/169;
   92/51—53, 150, 151, 152, 52

[56] References Cited
UNITED STATES PATENTS

| 2,231,680 | 2/1941 | Pfauser.......................... | 277/103 X |
| 2,646,504 | 7/1953 | Gosline ......................... | 92/52 |
| 2,879,094 | 3/1959 | Transeau...................... | 277/187 X |
| 3,300,225 | 1/1967 | Shepler ......................... | 277/187 X |

Primary Examiner—Mark M. Newman
Assistant Examiner—Cort R. Flint
Attorneys—H. J. Winegar, R. P. Miller and W. M. Kain ABSTRACT: Support apparatus elongatable in response to the exertion of fluid pressure thereagainst and useful, for example, for maintaining a fluid seal in proper sealing position. The elongation of the apparatus, or tendency of the apparatus to elongate, in response to the exertion of pressurized fluid thereagainst, urges the fluid seal into proper sealing position and supports the elements of the seal against disorientation and deformation.

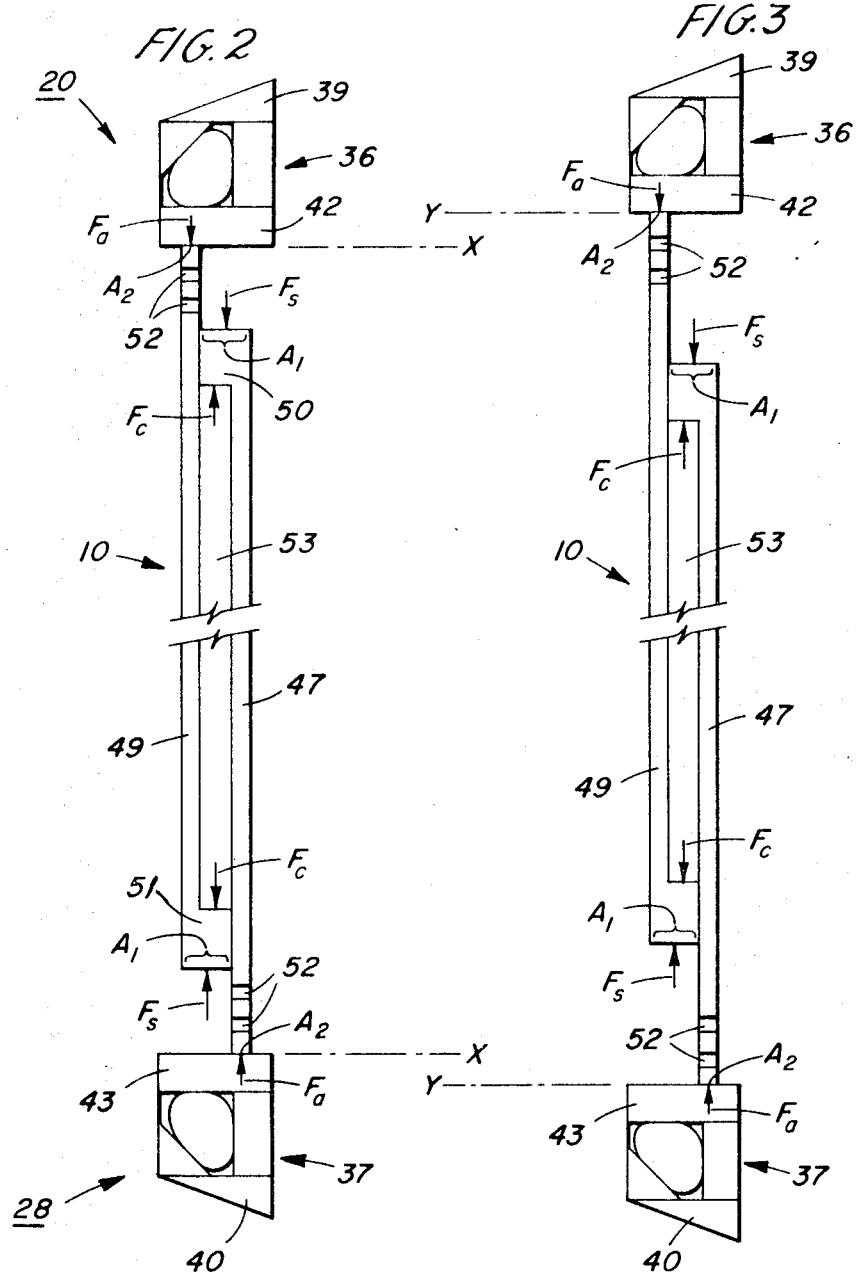

PRESSURE ELONGATABLE SUPPORT APPARATUS

BACKGROUND OF THE INVENTION

As is known in the pressure vessel art, fluid contained in a pressure vessel is typically pressurized by the advancement of a piston into the pressure vessel, through an opening provided in the pressure vessel wall, to engage and exert pressure against the fluid. To prevent leakage of the pressurized fluid around the piston and between the piston and the wall of the pressure vessel, a circular seal assembly is typically provided which surrounds the piston in very close sliding engagement. To provide proper sealing action, the seal assembly is positioned at a relatively specific location between the piston sliding therethrough to pressurize the fluid, and the walls of the pressure vessel.

When operating at relatively low-pressure levels, such seal assemblies generally remain in their sealing positions and usually function quite satisfactorily. However, it has been found that when the fluid is pressurized to the higher levels, and in particular when pressurized to 150,000 p.s.i. and above (around 500,000 p.s.i. for example), the seal assemblies are usually forced into such tight frictional engagement with the piston, that the seal assemblies are moved out of their proper sealing positions by the inward pressurizing movement of the piston. Upon such occurrences, leakage of pressurized fluid occurs, and any work operation taking place in the pressure vessel is aborted.

This problem is further aggravated by the fact that many of the seal assemblies structured for use at the higher pressure levels include multiple component parts. To function properly, such component parts must be oriented in predetermined positions relative to each other, and, any disorientation of the component parts can result in a rupture of the sealing action being provided. Movement of the high-pressure seal assemblies out of their sealing positions generally results in a disorientation of their component parts. Accordingly, it is particularly significant, when operating at the higher pressure levels, to insure that such high-pressure seal assemblies are maintained in their sealing positions to prevent disorientation of their component parts.

Most seal assemblies are not self-retaining, i.e. additional, nonsealing structure is required for maintaining the sealing structure in sealing position. Among the presently known apparatus for retaining seal assemblies in sealing position, are threaded retainer rings, snaprings mounted in annular channels provided in the pressure vessels being sealed, and seal retainer cylinders which are mounted within a pressure vessel to be sealed and extend, as would a prop or wedge, between opposed seals or between a seal and a supporting surface so as to maintain the seal or seals in sealing position.

The use of seal retainer cylinders is generally accepted as being a desirable approach to the problem of retaining seal assemblies in sealing position; however, their performance, particularly at the higher pressure levels, has not been entirely satisfactory. More particularly, it has been found that when known seal retainer cylinders are subjected to extremely high fluid pressures, there is a tendency of the cylinder to be compressed and reduced in physical size, and most importantly, a tendency toward relatively substantial reductions in length. Obviously, a reduction in the length of a seal retainer cylinder disposed as a wedge between a pair of seals, or between a seal and appropriate support structure, causes the seal retainer to lose its capacity for seal retention since, as it becomes shorter than the gap between the seals which must be bridged it becomes unable to exert sufficient force against the seals for maintaining them in sealing position. Additionally, the effect of reducing the length of the seal retainer cylinder as a result of the compressive effect of the high-pressure fluid is compounded by the fact that vessels which contain high-pressure fluid are subject to expansion as the pressure of the contained fluid increases. This expansion causes a further lengthening of the gap between opposed seals or between a seal and its support element; thus, the net effect in reducing the length of the retainer cylinder is compounded by the further increase in distance which it is required to extend to remain effective.

A loss of support for a seal assembly from a seal retaining means, particularly at the higher pressure levels, may result in loss of sealing action altogether, disorientation of the seal assembly components and premature failure of the material and the seal assembly components.

SUMMARY OF THE INVENTION

The present invention provides support apparatus which is elongatable upon being subjected to pressurized fluid.

When embodied as a seal assembly retaining cylinder, the present invention may include cylindrical apparatus which is elongatable in response to increases in fluid pressure thereagainst so as to maintain the seal assembly in sealing position within a pressure vessel, notwithstanding increases in the pressure level of the fluid. Such elongatable retaining cylinder, unlike the above-described prior art retaining cylinders, elongates, or at least tends to do so, rather than contracting or shortening in response to fluid pressure, and by elongating provides retaining forces to the seal assembly thereby maintaining the seal assembly in proper sealing position. And, if the seal assembly is a high-pressure seal assembly including multiple component parts, the retaining forces supplied by the elongatable seal retaining cylinder prevent disorientation and deformation of the component parts.

Furthermore, retaining forces supplied by the elongatable retaining cylinder of the present invention are in the desired proportion, i.e., the higher the fluid pressure and the greater the tendency of the seal assembly to be moved and of its sealing position and any included component parts disoriented, the greater the retaining forces supplied by the elongatable retaining cylinder.

BRIEF DESCRIPTION OF THE DRAWINGS

A more complete understanding of the present invention may be obtained from the following detailed description of an embodiment of the present invention, when read in conjunction with the attached drawings wherein:

FIG. 2 is a schematic view of a seal retainer cylinder according to the present invention in an unloaded or nonelongated position; and FIG. 3 is a schematic view similar to the view of FIG. 2 but with the seal retainer cylinder of the present invention shown in a loaded or elongated position.

DETAILED DESCRIPTION

Figure 1:
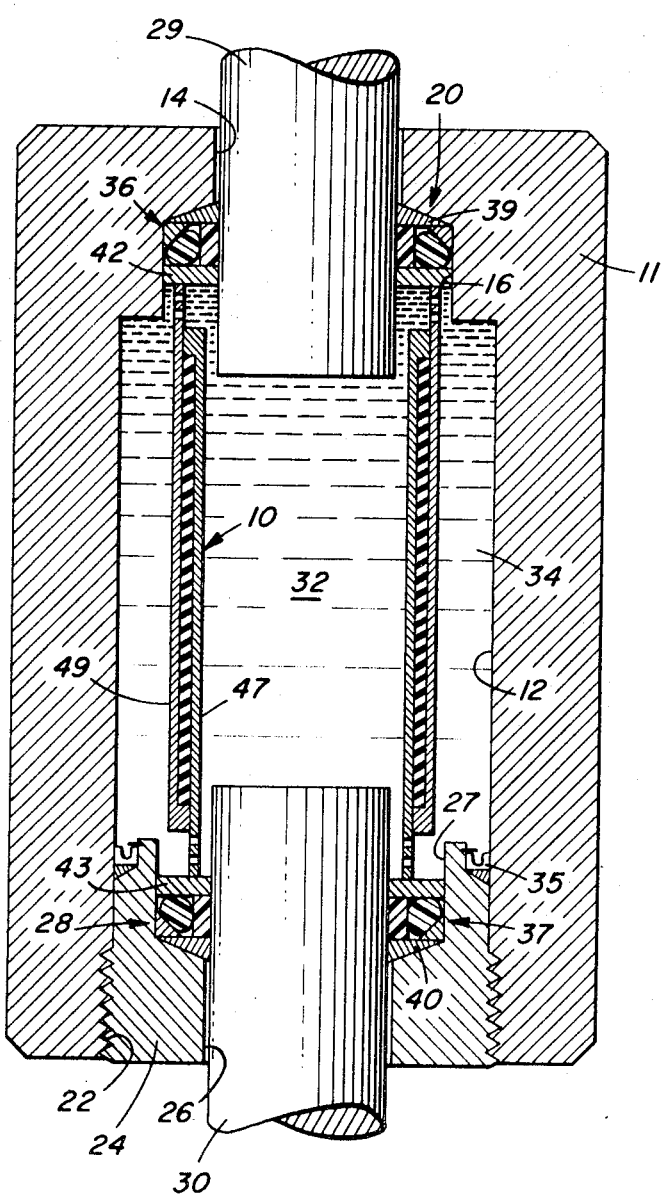
FIG. 1 is a cross-sectional, elevational view of a high-pressure vessel wherein seal assemblies are retained in sealing position by a seal retainer cylinder embodying the present invention.

Referring therefore to FIG. 1, there is shown one embodiment of a seal retainer cylinder according to the present invention, designated generally by the reference numeral 10. Seal retainer cylinder 10 is shown in use with a high-pressure fluid vessel 11 which has first bore 12 extending axially through substantially the entire length thereof, and a second bore 14, extending coaxially with first bore 12 through the remaining upper axial length of vessel 11. Second bore 14 is provided with a counterbore 16 extending coaxially therewith from the inner end of second bore 14. Counterbore 16 defines an annular channel for receiving a seal assembly, designated generally by the reference numeral 20, which assembly is to be retained in the annular channel by the seal retainer cylinder 10.

The lower open end of first bore 12 is provided with threads 22 for threadedly receiving an access plug 24 therein which is removable to gain access to the interior of fluid vessel 11. Access plug 24 is provided with a bore 26 and a counterbore 27 which are coaxial with second bore 14 and counterbore 16 of fluid vessel 11. Counterbore 27 opens into bore 12 of vessel 11 and defines an annular channel for receiving a seal assembly 28 which is to be retained by seal retainer cylinder 10.

Reciprocably received through bores 14 and 26 are coaxial, opposed pistons 29, 30 which serve to pressurize a working fluid 32 contained in a fluid chamber 34 which is defined by first bore 12 of vessel 11, plug 24 and pistons 29 and 30. Leakage of fluid from chamber 34 past pistons 29 and 30 is prevented by the sealing action of seal assemblies 20, 28 mounted in counterbores 16 and 27, respectively, and past plug 24 through first bore 12 by a seal assembly 35 which is mounted in an annular channel formed in the outer peripheral surface of the inner end of plug 24.

As was noted above, the seal assemblies 20 and 28 are provided in counterbores 16 and 27, respectively, to preclude leakage of fluid from fluid chamber 34 past pistons 29 and 30. Seal assemblies 20, 28 each include multiple components indicated generally by reference numerals 36, 37, and also include a bevel-edged antiextrusion ring 39, 40, and a retaining washer 42, 43, respectively. Washers 42 and 43 act as bearing surfaces for the seal retainer cylinder 10.

Seal retainer cylinder 10 comprises two concentrically disposed, spaced cylinders 47, 49, each of the cylinders 47, 49 being shorter than the longitudinal distance between washers 42 and 43. The cylinders are arranged so that inner cylinder 47 is in end-abutting engagement with washer 43, and outer cylinder 49 is in end-abutting engagement with washer 42.

Referring to FIGS. 2 and 3 inner cylinder 47 is provided with a radially outwardly directed annular shoulder 50 adjacent its end remote from washer 43, shoulder 50 being adapted for surface-to-surface, fluidtight sliding engagement with the inner surface of outer cylinder 49. Similarly, outer cylinder 49 is provided with a radially inwardly directed annular shoulder 51 adjacent its end remote from washer 42, shoulder 51 being adapted for surface-to-surface fluidtight sliding engagement with the outer surface of inner cylinder 47. Thus, it can be seen that the inner surface of outer cylinder 49, the outer surface of inner cylinder 47, and shoulders 50, 51 cooperate to define a fluidtight chamber 53 wherein there is contained a suitable compressible medium. In this regard, it will become more clear during the following description of the operation of the seal retainer cylinder, that chamber 53 is fluid tight so as to preclude the entry thereinto of working fluid 32. Exclusion of working fluid 32 from chamber 53 facilitates the operation of seal retainer cylinder 10 in that the capability of the retainer cylinder 10 to elongate is dependent upon the pressure within chamber 53 being less than that being exerted against the outer surfaces of cylinder 10 by fluid 32. It is to be recognized, however, that once fluidtight seals are established between cylinders 47, 49 and shoulders 51, 50, respectively, the seals are securely established since any increase in the pressure of fluid 32 increases the sealing force by urging the cooperating cylinders and shoulders into tighter sealing engagement. At no time, however, are the forces between the respective cylinder and shoulders sufficient to preclude the sliding movement therebetween which is necessary to facilitate elongation.

As stated above, chamber 53 contains a suitable compressible medium. With regard to such suitability, the medium can comprise virtually any material which is more easily compressible than the material of cylinders 47, 49 and which, upon the exertion of pressure by fluid 32, can support the walls of chamber 53 against collapse; cylinders 47, 49 may be made from a suitable steel, e.g., maraging steel. It is desirable, although not necessary, that the compressible medium in chamber 53 exhibit sufficient resilience to fully reoccupy chamber 53 upon the shortening of seal retainer cylinder 10 in response to a decrease in fluid pressure thereagainst. With material of such resilience, the interior walls of chamber 53 are supported from within throughout the full range of pressures generated within fluid 32 and the seal retainer cylinder is reusable for an indefinite number of pressure cycles. In the absence of such resiliency, i.e. if the material in chamber 53 is permanently deformed or crushed by the compression which occurs during elongation, the seal retainer cylinder may not be reusable after once being subjected to load. In either event, any material which may be compressed or crushed within chamber 53 so as to not interfere with the elongation of seal retainer cylinder 10 in response to an increase in the pressure exerted thereon, is satisfactory for use so long as it is capable of supporting the walls of chamber 53 against collapse under the exerted pressure. It is also to be noted that if the fluid pressure to which the seal retainer is to be subjected is not too high relative to the structural capability of the cylinder material, there may be situations wherein it is not required to provide a support material within chamber 53. For most high fluid pressure applications where the seal retainer cylinder of the present invention is primarily useful, improved results are achieved with the chamber 53 filled with compressible support materials. Among those materials which are suitable for filling chamber 53 are solid urethane, Teflon and aluminum.

Each of cylinders 47, 49 is provided with throughbores or openings 52 at their washer adjacent ends to allow free passage of fluid 32 to the space around retainer cylinder 10. Thus, all surfaces of cylinder 10, both inner and outer, are subjected to the fluid pressure in the working fluid 32.

As can be seen from FIGS. 2 and 3, seal retainer cylinder 10 can vary in length by reason of inner cylinder 47 being telescopically received within outer cylinder 49. During the manufacture of the inner and outer cylinders, the surfaces of cylinders 47 and 49 and their respective shoulders 50, 51 are dimensioned, and the retainer cylinder elements are assembled to provide a fluidtight frictional engagement between the shoulders and their corresponding cylinder surfaces. Under no load or light loading, the frictional engagement between the outer surface of shoulder 50 and the inner surface of cylinder 49, and the inner surface of shoulder 51 and the outer surface of cylinder 47, is sufficient to preclude relative movement between cylinders 47 and 49. Such frictional engagement is sufficient, therefore, to enable retainer cylinder 10 to support seal assemblies 20 and 28 in sealing position at no load and light load conditions. Accordingly, in assembling the apparatus for operation, cylinder 10 is set at a length which is slightly longer than its desired no-load condition length, i.e. the desired distance between washers 42 and 43 at a no pressure load condition. Thereafter, the components are loosely assembled and plug 24 is threadedly advanced into bore 12. The advance of plug 24 into bore 12 causes engagement of washers 42 and 43 with seal retainer cylinder 10, thereby causing seals 20 and 28 to be slightly compressed and maintained in sealing position.

As noted above, however, the introduction of high fluid pressures within chamber 34 generates forces which tend to compress seal retainer cylinder 10 and to expand vessel 11. Thus, as vessel 11 is expanded and as upper and lower seal assemblies 20, 28 become compressed due to the exertion of ultrahigh fluid pressures within vessel 11, upper and lower seal assemblies 20, 28 become more separated. This increased separation is shown schematically in FIGS. 2 and 3 by the movement of washers 42, 43 from the position "X" in FIG. 2 to the position "Y" in FIG. 3. As is also evident from FIGS. 2 and 3, the increase in the distance separating seals 20, 28 is complemented by a corresponding increase in the length of seal retainer cylinder 10 thereby providing continuing support for seals 20, 28.

Extension of seal retainer cylinder 10 from the position of FIG. 2 to the position of FIG. 3 is accomplished concurrently with the buildup of fluid pressure within the vessel 11 and the separation of seals 20, 28. More specifically, and referring to FIGS. 2 and 3, a pressure within vessel 11 causes forces to be exerted or generated against each of the inner and outer cylinders 47, 49 respectively. Of primary interest to the present invention are the vertical components of the exerted forces, indicated by the arrows in FIGS. 2 and 3, since these components bear upon the elongation of the seal retainer cylinder 10 as required. Thus, the vertical components of forces upon the inner and outer cylinders are:

$F_1$, the forces generated by the pressure of fluid 32 (FIG. 1) in vessel 11 against each outer, horizontal surface of shoulders 50, 51 each having surface having an area $A_1$;

$F_a$, the forces exerted against the washer adjacent horizontal surfaces of the inner and outer cylinders, each surface having an area $A_2$. It is to be recognized that force $F_a$ may be generated by the pressure of fluid 32 against area $A_2$ and caused by fluid 32 getting between the ends of the cylinders and the washers 42, 43, or may be the reactive force caused by the physical engagement of the ends of the cylinders with washers 42, 43, or a combination of both; and $F_c$, the forces exerted by the material in chamber 53 against the inner horizontal surfaces of shoulders 50 and 51.

As noted above, the material in chamber 53 can be virtually any material which is more easily compressible than the material of cylinders 47, 49 and which, upon the exertion of pressure by fluid 32, can support the walls of chamber 53 against collapse. It is also to be recognized that the scale of FIGS. 2 and 3 is greatly exaggerated and that in reality the difference in distance between positions "X" and "Y" may amount to only a few thousandths of an inch. Accordingly, it will be assumed for purposes of the following discussion that the medium in chamber 53 is relatively highly compressible, and that the decrease in volume of chamber 53, as a result of the elongation of seal retainer ring 10, does not significantly increase the pressure of the medium in chamber 53, and therefore does not significantly change the magnitude of $F_c$. Thus, $F_c$ will be hereinafter disregarded and the analysis of vertically acting forces in seal retainer ring 10 will be directed to those forces acting against the outer horizontal surfaces of shoulders 50, 51, and those forces acting against the washer-adjacent horizontal surfaces of the cylinders.

As discussed above, prior to placement in vessel 11 and loading by increasing the pressure of fluid 32, seal retainer 10 is maintained in assembled condition by the surface of shoulder 50 of inner cylinder 47 and the inner surface of cylinder 49 and the inner surface of shoulder 51 of outer cylinder 49 and the outer surface of inner cylinder 47. This friction is also sufficient to preclude loss of the medium from chamber 53.

Once the seal retainer cylinder 10 has been placed as shown in FIG. 1, retainer cylinder 10 assumes the seal retaining position shown in FIG. 2. In this position, the fluid 32 exerts a pressure $P_F$ against the outer horizontal surfaces of shoulders 50, 51 and is thereby generating a force $F_s$ against each surface. Opposing these forces $F_s$ are the forces $F_a$ acting against the washer-adjacent surfaces of cylinders 47, 49. As noted above, $F_a$ may be solely reactive from washers 42, 43, it may be solely the result of fluid pressure $P_F$ acting against the area $A_2$ of each of the cylinders, or it may be a combination of both. At the low-pressure stage presently being considered, however, it is considered sufficiently accurate to state that there is no pressure-exerting fluid between the washer-adjacent horizontal cylinder surfaces and washers 42, 43, and that, therefore, $F_a$ is solely the reactive force being exerted by washers 42, 43 against cylinders 47, 49 respectively. At relatively low-pressures, seals 20, 23 are not caused to be substantially compressed, nor is vessel 11 caused to be elongated; therefore, washers 42, 43 are maintained relatively stationary, and no elongation occurs in retainer cylinder 10. Cylinder 10, not being elongated, can be described as being in a state of vertical force eluilibrium, thus:

$F_s = F_a$   (1)

where, $F_s = P_F A_1$ for each of shoulders 50, 51 and $F_a$ = the reactive forces of the washers 42, 43 against the washer-adjacent ends of cylinders 47, 49.

Upon an increase of fluid pressure $P_F$ by an amount sufficiently great to expand the vessel 11, compress seal assemblies 20, 28 and separate washers 42, 43, the reactive force exerted by washers 42, 43 is decreased and fluid 32 tends to enter between the cylinders 47, 49 and washers 43, 42, thus subjecting areas $A_2$ to fluid pressure $P_F$. Accordingly, it may be said that at this stage:

$F_a = P_F A_2$, and   (2)
$F_s = P_F A_1$.

Since $A_1$ is greater than $A_2$ and since both areas are subjected to common pressure $P_F$, $F_s$ must be greater than $F_a$, and therefore, cylinders 47 and 49 will be urged downwardly and upwardly, respectively, until washers 42 and 43 have stopped their separation and cylinders 47, 49 can once again bear against their respective washer surfaces so as to establish a vertical force equilibrium.

Assuming that the fluid pressure $P_F$ is sufficient to displace the vessel and other components from the position shown in FIG. 2 to the position shown in FIG. 3, it can be seen that the inner surfaces of washers have been displaced from positions X-X to positions Y-Y. Because during the displacement of the washers $F_s$ is greater than $F_a$ as noted above, retainer cylinder 10 increases in length by an amount corresponding to the displacement of the washers, and continues until the force equilibrium on the retainer cylinder is reestablished and equation (1) is once again satisfied.

In brief summary restatement FIGS. 2 and 3, the net force on inner cylinder 47, i.e., the summation force of opposed or differential forces $F_s$ and $F_a$ acting on inner cylinder 47; and the net force on outer cylinder 49, i.e., the summation force of opposed or differential forces $F_S$ and $F_a$ acting on outer cylinder 49; are of sufficient net magnitudes to cause relative movement between the cylinders and elongation of the seal retainer cylinder 10. Further, when as mentioned above, the fluid pressure $p_F$ has increased sufficiently to enter between the cylinders 47, 49 and washers 42, 43, the fluid pressure generated, differential forces $F_s$ and $F_a$, received by the respective cylinder shoulders 50, 51, and washer adjacent surfaces 47, 49, of the cylinders, will be of sufficient net magnitudes to cause relative movement between the cylinders and elongation of the seal retainer cylinder 10.

It is to be recognized that upon a reduction in the pressure of fluid 32, $P_F$, $F_s$ will be reduced and $F_a$ will become relatively greater in response to the tendency of seals 20, 28 to decompress and of the vessel 11 to elastically return to its original shape. Under these circumstances, exactly the opposite procedure to that described above will occur and the retainer cylinder 10 will be shortened until the force equilibrium is reestablished.

It can be seen, therefore, that retainer cylinder 10 tends to elongate in response to increases in fluid pressure within vessel 11, and also is capable of being shortened by the elastic return of the vessel and seal structures to their original positions upon a decrease in the fluid pressure within the vessel. In this manner, seal retainer cylinder 10 maintains a retaining force against the high-pressure sealing assemblies during a full operational pressure cycle which may be experienced during a typical metal forming operation or the like.

As was noted above, seal retainer cylinders structured according to the present invention may be used not only between a pair of seals, but also between a seal and a reaction surface or otherwise suitably positioned between any members to be supported. Further, it is to be recognized that although the present invention has been disclosed in terms of a cylindrical telescoping apparatus for retaining high-pressure seals in sealing position, the use of retaining apparatus configured other than as the telescoping cylinders shown is also contemplated. Additionally, numerous other modifications may be deviced without departing from the spirit and scope of the invention.

We claim:

1. Apparatus elongatable upon subjection to a completely surrounding pressurized fluid, comprising:
   a first member provided with a first surface and a second large surface;
   a second member provided with a first surface and a second larger surface;
   said members positioned in slidable engagement with each other; and
   said first and second surfaces of said members, upon being subjected to said completely surrounding pressurized fluid which acts on both the inside and outside of said members, for receiving forces generated by said completely surrounding pressurized fluid of sufficient resultant magnitudes to slide said first and second members relative to each other to elongate said apparatus.

2. Apparatus elongatable in response to the application thereto of a completely surrounding pressurized fluid, said apparatus comprising:
a first member;
a second member in sliding engagement with said first member;
said first and second members being relatively movable in an axial direction;
said first member having a first surface extending substantially normal to said axial direction and a second surface extending substantially normal to said axial direction, said second surface being larger in area than said first surface;
said second member having a first surface extending substantially normal to said axial direction and a second surface extending substantially normal to said axial direction, said second surface being larger than said first surface; and
said first and second surfaces on each said first and second members, upon the application thereto of said completely surrounding pressurized fluid which acts on both the inside and outside of said members, for receiving forces generated by said completely surrounding pressurized fluid of sufficient net magnitudes to cause relative sliding axial movement between said members and elongation of said apparatus.

3. Apparatus as claimed in claim 2 wherein:
said first member includes a body portion having a shoulder formed on one end thereof;
said second member includes a body portion having a shoulder formed on one end thereof; and
said first surfaces on said first and second members are surfaces of said body portions and said second surfaces on said first and second members are surfaces of said shoulder portions.

4. Apparatus as claimed in claim 2 wherein said shoulder portion of said first member is in sliding engagement with said body portion of said second member, and said shoulder portion of said second member is in sliding engagement with said body portion of said first member.

5. Apparatus as claimed in claim 3 wherein said shoulder portion of said first member is in substantially fluidtight sliding engagement with said body portion of said second member, said shoulder portion of said second member is in substantially fluidtight sliding engagement with said body portion of said first member, and said shoulders and said body portions of said first and second members cooperate to define a fluidtight chamber.

6. Apparatus as claimed in claim 5 wherein said chamber is filled with a compressible material.

7. Apparatus as claimed in claim 6 wherein said compressible material is sufficiently resilient to fill said chamber at all times notwithstanding variations in the volume thereof.

8. Apparatus as claimed in claim 7 wherein said first and second members are substantially cylindrical and said second member is telescopically received within said first member, and wherein said first and second members are provided with openings to permit the free circulation of said pressurized fluid around the exterior of said apparatus.

9. Telescoping cylindrical apparatus elongatable in response to the exertion of fluid pressure thereagainst, comprising:
a first cylindrical member having an inner and an outer circumferential surface;
a second cylindrical member disposed concentrically within said first cylindrical member, and having an inner and an outer circumferential surface;
a first annular shoulder formed on said inner circumferential surface of said first cylindrical member, said first annular shoulder being in surface-to-surface sliding engagement with said outer circumferential surface of said second cylindrical member;
a second annular shoulder formed on said outer circumferential surface of said second cylindrical member, said second annular shoulder being in surface-to-surface sliding engagement with said inner circumferential surface of said first cylindrical member;
said inner circumferential surface of said first cylindrical member, said outer circumferential surface of said second cylindrical member of said first and second annular shoulders cooperating to define a fluidtight chamber between said first and second cylindrical members;
said fluidtight chamber filled with material more compressible than the material of said cylindrical members; and
said first and second annular shoulders, upon the exertion of fluid pressure thereagainst, for receiving oppositely directed fluid pressure generated forces of sufficient magnitudes to telescopically slide said cylindrical members with respect to each other thereby elongating said apparatus.

10. In a pressure vessel for containing fluid under high pressure, said vessel having at least one opening through a wall thereof for receiving a member therethrough, and sealing means for precluding leakage through said opening around said member, the improvement comprising:
a pair of concentrically disposed, telescoping cylinders for maintaining said sealing means in sealing position, said cylinders being elongatable in response to an increase in the pressure of said fluid in said vessel.

11. Apparatus as claim 10 wherein each of said cylinders is provided with an annular shoulder on one end thereof, said annular shoulder on each cylinder extending toward and being in fluidtight engagement with the adjacent cylindrical surface of the adjacent cylinder.

12. Apparatus as claimed in claim 11 wherein said cylinders and said shoulders cooperate to define a fluidtight chamber, and said fluidtight chamber is filled with a material of greater compressability than the material of said cylinders.

13. In a pressure vessel for containing fluid to be pressurized, said vessel having a first opening through a wall thereof for receiving therethrough a first fluid pressurizing piston, a second opening through a wall thereof for receiving therethrough a second fluid pressurizing piston, said second opening being substantially opposite said first opening; and first and second sealing means for surrounding said first and second pistons, respectively in sealing positions and for precluding leakage of said fluid, upon the pressurization thereof, through said first and second openings around said first and second pistons, respectively, the improvement comprising:
a first cylindrical member;
a second cylindrical member in sliding engagement with said first member;
said first and second cylindrical members being relatively movable in an axial direction;
each of said cylindrical members having a first surface extending substantially normal to said axial direction and a second surface extending substantially normal to said axial direction, said second surface being larger in area than said first surface;
said cylindrical members disposed within said pressure vessel spanning the distance between said first and second sealing means and in engagement with said first and said second sealing means; and
said first and second surfaces on each said cylindrical members exposable to said fluid, and upon the advancement of said pistons into said pressure vessel to pressurize said fluid, said surfaces for receiving fluid pressure generated forces of sufficient net magnitudes to cause relative movement between said cylindrical members; and
said cylindrical members, upon said relative movement therebetween, for exerting retaining forces against both of said sealing means to prevent movement of said sealing means with said pistons and to maintain said sealing means in said sealing positions.

UNITED STATES PATENT OFFICE
CERTIFICATE OF CORRECTION

Patent No. 3,584,884     Dated June 15, 1971

Inventor(s) FRANCIS JOSEPH FUCHS, JR.

It is certified that error appears in the above-identified patent and that said Letters Patent are hereby corrected as shown below:

Column 5, line 61 (specification page 14, line 7), "elvilibrium" should have been --equilibrium--.

Column 6, line 62 (specification page 17, line 4), "deviced" should have been --devised--;
line 68 (claim 7, line 4), "large" should have been --larger--.

Column 7, line 40 (claim 11, line 1) "claim 2" should have been --claim 3--.

Signed and sealed this 21st day of December 1971.

(SEAL)
Attest:

EDWARD M. FLETCHER, JR.
Attesting Officer

ROBERT GOTTSCHALK
Acting Commissioner of Patents